A. F. ZAHM.
PROPELLER THRUST AND TORQUE MEASURE.
APPLICATION FILED MAY 31, 1917.

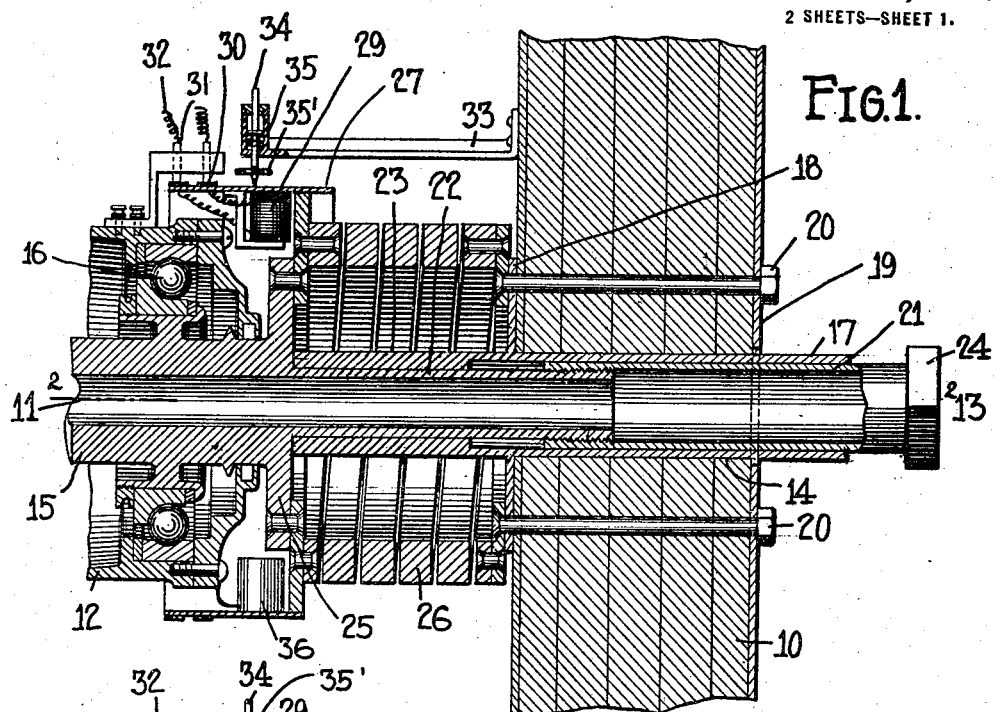
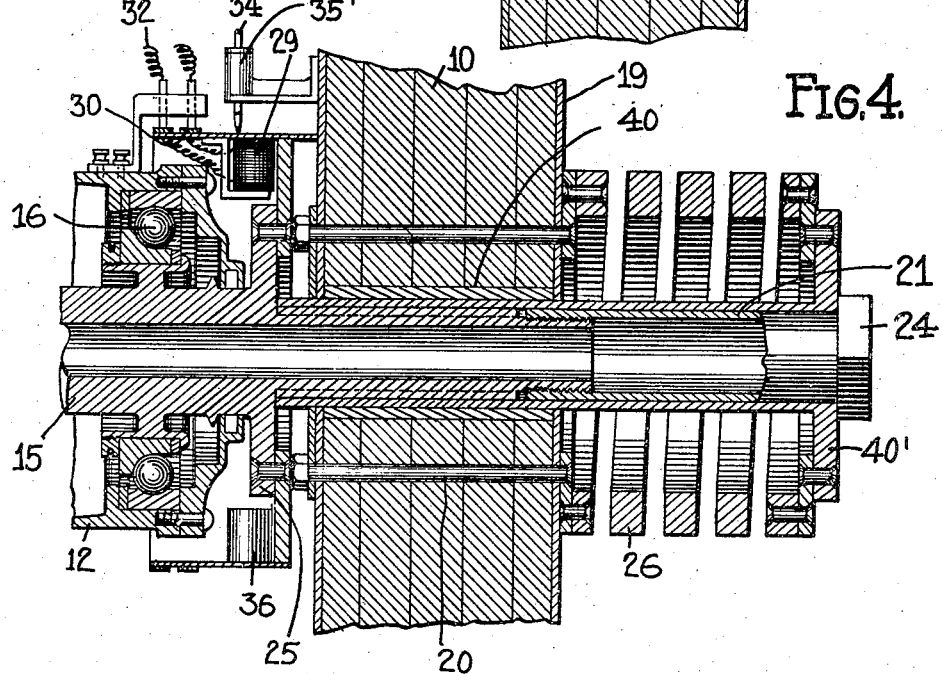

1,405,176.

Patented Jan. 31, 1922.
2 SHEETS—SHEET 2.

Inventor
ALBERT F. ZAHM.

By
Attorney

UNITED STATES PATENT OFFICE.

ALBERT F. ZAHM, OF WASHINGTON, DISTRICT OF COLUMBIA.

PROPELLER THRUST AND TORQUE MEASURE.

1,405,176.	Specification of Letters Patent.	Patented Jan. 31, 1922.

Application filed May 31, 1917. Serial No. 172,049.

*To all whom it may concern:*

Be it known that I, ALBERT F. ZAHM, a citizen of the United States, residing at Washington, in the District of Columbia, have invented certain new and useful Improvements in Propeller Thrust and Torque Measures, of which the following is a specification.

My invention relates to thrust and torque measures for motive power devices, prime movers, or otherwise, and has particular reference, in the embodiment shown, to the measurement of thrust and torque exerted by an aeronautical motor upon an aerial propeller.

In the problems of aerodynamics, propeller problems are among the most difficult of solution, and this difficulty heretofore has been due in a large degree to the inadequacy of available data upon which to found calculations, and to inaccuracy in part of that which was available. Necessity has frequently arisen, for instance, for predicating values of various factors at high speed operation upon values, the accuracy of which were, so far as known, sufficient only at the low speeds at which they were measured. Thus it has been necessary to utilize data pertaining to propeller blade sections obtained through testing them at very low wind velocities in laboratory tunnels when designing the blades of high speed propellers, the sections of which have velocities many times those available for the usual laboratory tests of blade sections. The thrust and torque measuring device which I have designed has enabled me to procure the data necessary for propeller design from the propeller of a machine in actual flight at full speed, whereby the accuracy of the several factors determined is unquestionable.

Simply expressed, my invention comprises an apparatus for measuring the axial thrust of the driving propeller and simultaneously the corresponding torque. These two functions are combined according to the best embodiment of my invention in a unitary apparatus. This apparatus comprises an axially and angularly or circumferentially yieldable driving connection between the driving motor and the propeller, together with a measuring device arranged to simultaneously measure the degree of axial and the degree of angular movement. More specifically stated, I drive the aerial propeller through the medium of an axially arranged spiral spring which is appropriately calibrated as to the number of pounds thrust per inch in the one case required to flex it axially, and the number of pounds torque in the other case required to flex it angularly. A pencil moving over a cooperative recording surface, serves to record the extent of axial and angular movement from which the thrust and torque are immediately obtainable. Obviously, the specific embodiment herein described is possessed of a wide variety of modifications. Thus, not only may the double function of a unitary device be described and duplex devices be employed each for obtaining one of the factors desired, but the character of the device itself may be altered in forms of well known and obvious equivalents with wide variety.

The embodiments specifically mentioned are shown in the accompanying drawings, of which—

Fig. 1 is a longitudinal section;

Fig. 4 is a longitudinal section of a modified type of measuring apparatus.

Figure 2:
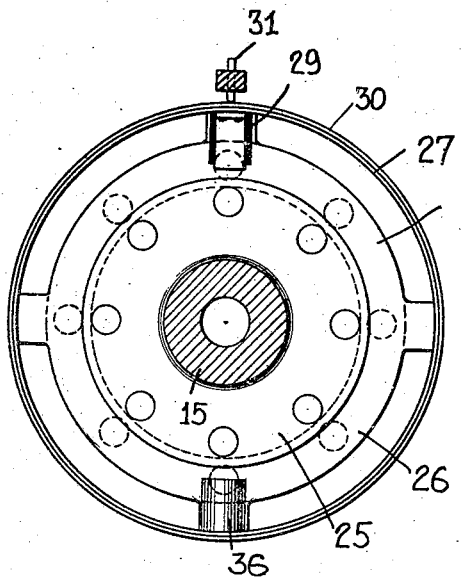
Fig. 2 is a section taken on line 2—2 of Fig. 1, looking in the direction of the arrows.
Figure 3:
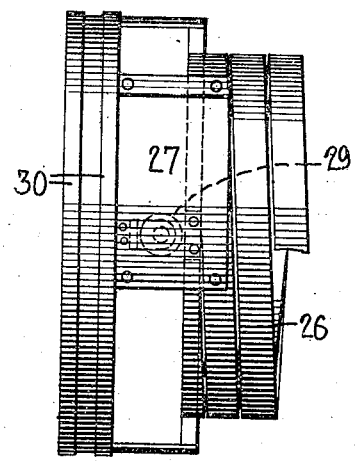
Fig. 3 is a plan view of the apparatus in the vicinity of the section on the line 2—2.

The propeller body is designated 10. It is arranged to be rotated about the axis 11 of an aeronautical motor which drives it, and the fixed casing of which is designated 12. The crank shaft extension designated as an entirely by the numeral 13 passes through the bore 14 of the propeller and supports the same, while the crank shaft 15 is itself supported upon the combined radial and axial thrust bearing 16 which may be of any known type. So far as concerns the disclosure of this invention, however, the function of this bearing is to prevent axial movement of the crank shaft 15 itself in so far as this is desirable. The support of the propeller 10 upon the crank shaft extension 13 is directly by means of a sleeve 17 which carries on one hand a flange 18, and on the other, an axially keyed flange 19 through which, by means of bolts 20, the propeller body is secured in driving relation to the sleeve 17. Sleeve 17 is correctly journalled for limited axial movement about an inner hub sleeve 21 threaded or otherwise secured firmly to the integral extended extremity 22 of the crank shaft 15. This extremity 22 is formed on the usual coupling stub. Further, propeller bearing sleeve 17 is provided at its inner end with a thickened portion 23, through which it is effectively journalled directly upon extension 22 as well as upon sleeve 21 for axial movement thereabout. From the extension 22 it receives its principal support. The principal function of the sleeve 21 is to secure the sleeve 17 against axial displacement. This is evidenced by the nut 24 on its end.

The crank shaft 15, in the form of aeronautical motor in connection with which my invention is embodied, is provided with an integral flange 25 normally used for direct connection to the propeller 10 by means of bolts such as 20. Between this driving flange 25 and the propeller 10 I interpose the calibrated spiral spring 26 of my invention, the torque of the driving motor being transmitted to the propeller through it. As disclosed it is riveted and bolted on the one hand to the flange 25 of shaft 15 and on the other hand to the propeller. This spring may be conveniently formed of high grade steel by first cutting a whole cylinder and thereafter spirally dividing the walls of the cylinder to form the spring, the width of the spiral groove being determined in accordance with the calculated degree of axial movement of which the propeller will partake.

Mounted circumferentially and concentrically with the crank shaft and axially fixed with respect thereto is a cylindrical record surface or drum 27 provided on its under side with an electromagnet 29 energized by current received through rings 30 contacting with brushes 31 of an electric circuit 32, the brushes being appropriately supported from the casing 12 of the motor. Carried by the propeller 10 or any part fixed thereto or partaking of its movement is an arm 33 carrying at its outer end a radially extending pencil 34 arranged to bear upon the record surface 27 within range of the electromagnet 29 and normally held out of contact with said record surface by means of a spring 35, but arranged to be drawn into contact with the surface to make a record thereon by means of the action of electromagnet 29 upon an armature 35' connected to it. Symmetrically arranged with respect to electromagnet 29, in this case diametrically opposite, is a counter-balancing means 36, the function of which is to prevent unbalancing of the shaft due to what might be a dissymmetrically located mass or magnet 29.

The apparatus of my invention is simply used. The spring 26 is calibrated as to axial and angular movement under known forces in the laboratory. The drum 27 is faced with paper record surface or not as desired, but preferably so faced, the paper being secured in any suitable manner. Thereupon the aeroplane upon which the apparatus is installed is started in flight. As the driving motor speeds up, the propeller exerts an axial thrust in one direction or the other according as the propeller is of the pusher or tractor type, and thereby moves axially upon its crank shaft bearings 17 and 22 a degree proportional exactly to the thrust. At the same time the propeller moves angularly upon the same bearing with respect to the crank shaft, a degree precisely proportional to the torque exerted. But no record is made for the reason that the pencil 34 is elevated above the surface 27. At the proper moment, however, when the motor reaches that particular speed indicated by the tachometer (not shown) at which the values of the factors are desired, an appropriate circuit controlling switch (likewise not shown), which may be in the form of the usual push button, is momentarily closed whereupon pencil 34 is drawn into contact with surface 27 by electromagnet 29, and a record of both axial and angular deflection made. The speed may be then adjusted to a different value and circuit 32 again momentarily closed with the result that a record of deflections at this second speed is made. Thus, records may be made for each and every speed desired whereupon flight may be terminated, the motor stopped and the measured values taken directly from the surface 27.

Referring now to the modification illustrated in Fig. 4 wherein the parts are shown reversed, it will be noted that the propeller 10 is interposed between the motor casing and the spring. An additional bearing sleeve 40 for the propeller 10 is provided. Motion is transmitted to the propeller by way of the spring 26. Said spring 26 is fastened to the flanged extremity 40' of the sleeve 17 and the sleeve 17 is in turn keyed to the extended extremity 22 of the motor shaft. Accordingly, the thrust of the propeller is measured through spring compression rather than through spring tension as in the preferred form of device. Moreover, the arm or bracket 33 is shortened considerably as is also the sleeve 17 and the sleeve 21. In this form of apparatus the convolutions of the spring are to be widely separated to compensate for maximum distortion under thrust strains.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

What is claimed is:

1. A combined torque and thrust measure for aeronautical propellers comprising a driving connection for the propeller and an axially and circumferentially distortable element interpolated in the driving connection together with means for recording the degree of such distortion.

2. A torque measure for aeronautical propellers comprising a driving connection for the propeller and a circumferentially distortable element interpolated in the driving connection together with means for marking and accordingly recording the degree of such distortion.

3. A thrust measure for aeronautical propellers comprising a driving connection for the propeller and an axially distortable element interpolated in the driving connection together with means for marking and accordingly recording the degree of axial distortion of said element.

4. A combined thrust and torque measure for aeronautical propellers comprising a driving connection for the propeller, an axially and circumferentially distortable calibrated spring interpolated in the driving connection and means for recording the degree of such distortion.

5. A combined thrust and torque measure for aeronautical propellers comprising a driven element, a driving connection between the driven element and the propeller, a circumferentially and axially distortable element interpolated in the driving connection, a recording surface, a connection between the recording surface and the driven element, and a marker movable with the propeller for indicating upon said recording surface the degree of such distortion.

6. A combined thrust and torque measure for aeronautical propellers including a driving connection for the propeller, a distortable element interpolated in the driving connection, means for recording the degree of such distortion, and means for controlling the operation of said recording means.

7. A combined thrust and torque measure for aeronautical propellers comprising a driving connection for the propeller, a distortable element interpolated in the driving connection, a recording means, and magnetic means for controlling the operation of said recording means.

8. A combined thrust and torque measure for aeronautical propellers comprising a driven element, a driving connection between the driven element and the propeller, an axially and circumferentially distortable calibrated spiral spring interpolated in the driving connection, a recording surface, a connection between the recording surface and the driven element, a marker movable with the propeller, and means for controlling the movement of said marker toward and from said recording surface.

9. A combined thrust and torque measure for aeronautical propellers comprising an axially and circumferentially distortable calibrated spring, a driving means for said propeller having connection with one end of said spring, a connection between the opposite end of said spring and said propeller, a recording surface, a connection between the recording surface and said driving means, a marker movable toward and from said recording surface and with said propeller, and means for controlling the first mentioned movement of said marker.

10. A combined thrust and torque measure for aeronautical propellers comprising a driving element for the propeller element, an axially and circumferentially distortable calibrated spiral spring interpolated in the driving element, a recording surface, a connection between the recording surface and one of said elements, a marker movable with the other of said elements, and means for controlling the movement of said marker and said recording surface toward each other.

11. A combined thrust and torque measure for aeronautical propellers comprising an axially and circumferentially distortable calibrated spring, a driving element for the propeller having connection with one end of said spring, a connection betwen the opposite end of said spring and said propeller element, a recording surface, a connection between the recording surface and one of said elements, a marker movable toward and from said recording surface and with the other of said elements, and means for controlling the first mentioned movement of said marker.

12. In an apparatus for testing aeronautical propellers in combination, a propeller element, a driving element, a driving connection between the propeller element and the driving element, a distortable member interpolated in the connection between said driving element and said propeller element, a recording surface, a connection between the recording surface and one of said elements, a marker movable with the other of said elements, and means for controlling the movement of said marker and said recording surface toward and away from each other.

In testimony whereof I hereunto affix my signature.

ALBERT F. ZAHM.